(12) United States Patent
Yamamoto et al.

(10) Patent No.: US 12,072,670 B2
(45) Date of Patent: Aug. 27, 2024

(54) METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

(71) Applicant: FUJIFILM Business Innovation Corp., Tokyo (JP)

(72) Inventors: Keita Yamamoto, Kanagawa (JP); Takashi Inukai, Kanagawa (JP); Yuji Isshiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 471 days.

(21) Appl. No.: 17/406,313

(22) Filed: Aug. 19, 2021

(65) Prior Publication Data

US 2022/0308480 A1     Sep. 29, 2022

(30) Foreign Application Priority Data

Mar. 25, 2021  (JP) .................................. 2021-052448

(51) Int. Cl.
*G03G 9/08* (2006.01)
*C08J 3/07* (2006.01)
*C08J 3/11* (2006.01)

(52) U.S. Cl.
CPC .............. *G03G 9/0804* (2013.01); *C08J 3/11* (2013.01); *C08J 2367/02* (2013.01)

(58) Field of Classification Search
None
See application file for complete search history.

(56) References Cited

U.S. PATENT DOCUMENTS 6,245,421 B1 *  6/2001  Aurenty ................. B41M 5/506
                                                         428/209
9,562,142 B2     2/2017  Zuo et al.
(Continued)

FOREIGN PATENT DOCUMENTS

CN        204583130 U  *  8/2015
JP        2010-070612 A     4/2010
(Continued)

OTHER PUBLICATIONS

CN-204583130-U Translation (Year: 2024).*

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

A method for producing a resin particle dispersion includes: preparing a phase-inverted emulsion by phase inversion emulsification of a resin using an organic solvent and an aqueous medium; and removing the organic solvent from the phase-inverted emulsion by reduced pressure distillation. The reduced pressure distillation is performed using a reduced pressure distillation device including: a distillation tank that contains the phase-inverted emulsion; a heating unit that heats a tank wall of the distillation tank by causing a heated fluid to flow inside the heating unit; and an agitating unit disposed inside the distillation tank, the agitating unit including an agitating shaft and one or plural gutter-shaped agitation impellers that are attached to the agitating shaft, rotate to agitate the phase-inverted emulsion, and draw up the phase-inverted emulsion to form a liquid film of the phase-inverted emulsion on a heat transfer surface of the distillation tank in a portion above a liquid level of the phase-inverted emulsion. The aqueous medium is added to the phase-inverted emulsion contained in the distillation tank during the reduced pressure distillation.

20 Claims, 2 Drawing Sheets

(56) References Cited

U.S. PATENT DOCUMENTS

| | | | | |
|---|---|---|---|---|
| 2005/0203278 | A1* | 9/2005 | McCreight | C08J 3/07 |
| | | | | 536/64 |
| 2006/0222992 | A1* | 10/2006 | Kamoto | G03G 9/0804 |
| | | | | 430/108.8 |
| 2011/0086301 | A1* | 4/2011 | Cheng | G03G 9/08755 |
| | | | | 430/108.4 |

FOREIGN PATENT DOCUMENTS

| JP | 2011-164344 A | 8/2011 |
|---|---|---|
| JP | 6656065 B2 | 3/2020 |

* cited by examiner

METHOD FOR PRODUCING RESIN PARTICLE DISPERSION, METHOD FOR PRODUCING TONER FOR ELECTROSTATIC IMAGE DEVELOPMENT, AND TONER FOR ELECTROSTATIC IMAGE DEVELOPMENT

CROSS-REFERENCE TO RELATED APPLICATIONS

This application is based on and claims priority under 35 USC 119 from Japanese Patent Application No. 2021-052448 filed Mar. 25, 2021.

BACKGROUND

(i) Technical Field

The present disclosure relates to a method for producing a resin particle dispersion, to a method for producing a toner for electrostatic image development, and to a toner for electrostatic image development.

(ii) Related Art

For example, Japanese Unexamined Patent Application Publication No. 2010-70612 discloses "an aqueous dispersion production apparatus including: an aqueous dispersion production bath for producing an aqueous dispersion; distillate composition detecting means for detecting the composition of a distillate collected from the aqueous dispersion production bath during removal of a solvent; at least two distillate collection baths for collecting distillates separated according to their composition; and supply means for supplying at least one of the distillates collected in the distillate collection baths to the aqueous dispersion production bath."

Japanese Unexamined Patent Application Publication No. 2011-164344 discloses "a method for producing toner base particles, the method including the steps of: preparing a first solution by dissolving or dispersing a toner material including at least a binder resin and/or a binder resin precursor, a coloring agent, and a release agent in an organic solvent; preparing a second solution by emulsifying or dispersing the first solution in an aqueous medium, the second solution having a viscosity of from 50 mPa·sec to 800 mPa·sec inclusive, the viscosity being measured using a Brookfield viscosity meter at a number of rotations of 60 rpm and a temperature of 25° C.; and volatilizing the organic solvent by causing the second solution to flow substantially vertically downward along an inner wall surface of a tube evacuated to a pressure of 70 kPa or lower to thereby form a liquid film and heating the second solution using a heating unit through the wall surface of the tube while the temperature of the second solution in the form of the liquid film is maintained at a temperature equal to or lower than the glass transition point of the toner base particles, wherein a lower end of the tube through which the second solution flows as the liquid film protrudes from the heating unit."

SUMMARY

A resin particle dispersion is known to be produced by removing an organic solvent from a phase-inverted emulsion by reduced pressure distillation.

One known device for performing the reduced pressure distillation is "a reduced pressure distillation device (hereinafter may be referred to as "a specific reduced pressure distillation device") including: a distillation tank that contains a phase-inverted emulsion; a heating unit that heats a tank wall of the distillation tank by causing a heated fluid to flow inside the heating unit; and an agitating unit disposed inside the distillation tank, the agitating unit including an agitating shaft and one or a plurality of gutter-shaped agitation impellers that are attached to the agitating shaft, rotate to agitate the phase-inverted emulsion, and draw up the phase-inverted emulsion to form a liquid film of the phase-inverted emulsion on a heat transfer surface of the distillation tank in a portion above a liquid level of the phase-inverted emulsion."

Aspects of non-limiting embodiments of the present disclosure relate to a resin particle dispersion production method including: preparing a phase-inverted emulsion by phase inversion emulsification of a resin using an organic solvent and an aqueous medium; and removing the organic solvent from the phase-inverted emulsion by reduced pressure distillation using a specific reduced pressure distillation device. With this resin particle dispersion production method, the degree of reduction in the yield of the resin particle dispersion that is caused by adhesion of the resin to the inner wall surface of the distillation tank is smaller than that when the aqueous medium is not added to the phase-inverted emulsion contained in the distillation tank of the specific reduced pressure distillation device during the reduced pressure distillation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a resin particle dispersion, the method including:
  preparing a phase-inverted emulsion by phase inversion emulsification of a resin using an organic solvent and an aqueous medium; and
  removing the organic solvent from the phase-inverted emulsion by reduced pressure distillation,
  wherein the reduced pressure distillation is performed using a reduced pressure distillation device including
  a distillation tank that contains the phase-inverted emulsion,
  a heating unit that heats a tank wall of the distillation tank by causing a heated fluid to flow inside the heating unit, and
  an agitating unit disposed inside the distillation tank, the agitating unit including an agitating shaft and one or a plurality of gutter-shaped agitation impellers that are attached to the agitating shaft, rotate to agitate the phase-inverted emulsion, and draw up the phase-inverted emulsion to form a liquid film of the phase-inverted emulsion on a heat transfer surface of the distillation tank in a portion above a liquid level of the phase-inverted emulsion, and
  wherein the aqueous medium is added to the phase-inverted emulsion contained in the distillation tank during the reduced pressure distillation.

BRIEF DESCRIPTION OF THE DRAWINGS

Exemplary embodiments of the present disclosure will be described in detail based on the following figures, wherein.

DETAILED DESCRIPTION

Figure 1:
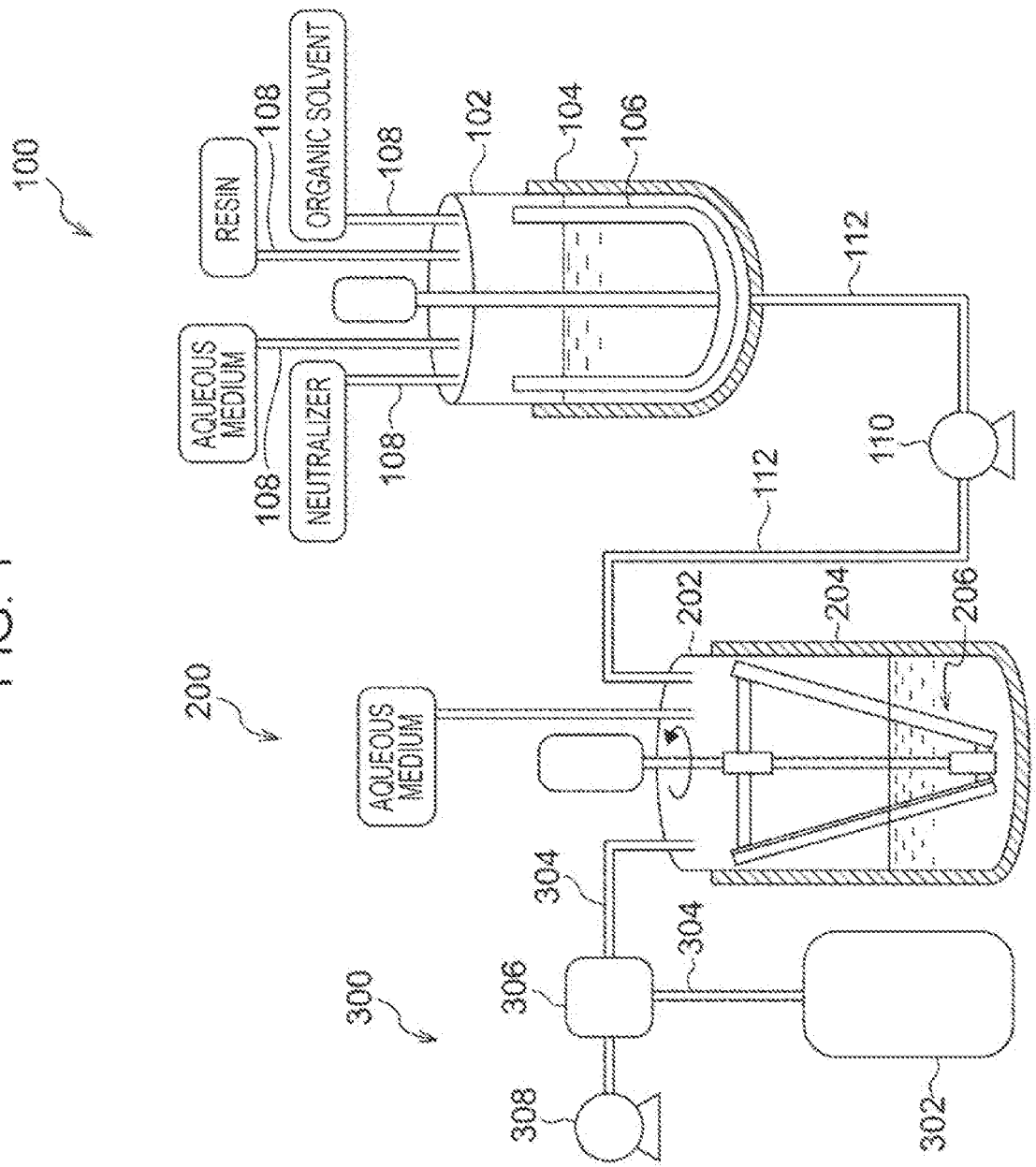
FIG. 1 is a schematic configuration diagram of an example of a production apparatus used for a resin particle dispersion production method according to an exemplary embodiment.

Exemplary embodiments of the present disclosure will be described below. The description and Examples are illustrative of the present disclosure and are not intended to limit the scope of the present disclosure.

In the present specification, a numerical range represented using "to" means a range including the numerical values before and after the "to" as the minimum value and the maximum value, respectively.

In a set of numerical ranges expressed in a stepwise manner in the present specification, the upper or lower limit in one numerical range may be replaced with the upper or lower limit in another numerical range in the set. Moreover, in a numerical range described in the present specification, the upper or lower limit in the numerical range may be replaced with a value indicated in an Example.

In the present specification, the term "step" is meant to include not only an independent step but also a step that is not clearly distinguished from other steps, so long as the prescribed purpose of the step can be achieved.

In the present specification, when an exemplary embodiment is explained with reference to the drawings, the structure of the exemplary embodiment is not limited to the structure shown in the drawings. In the drawings, the sizes of the components are conceptual, and the relative relations between the components are not limited to these relations.

In the present specification, any component may contain a plurality of materials corresponding to the component. In the present disclosure, when reference is made to the amount of a component in a composition, if the composition contains a plurality of materials corresponding to the component, the amount means the total amount of the plurality of materials, unless otherwise specified.

In the present specification, the "toner for electrostatic image development" may be referred to simply as a "toner."
<Resin Particle Dispersion Production Method>

A resin particle dispersion production method according to an exemplary embodiment includes the steps of: preparing a phase-inverted emulsion by phase inversion emulsification of a resin using an organic solvent and an aqueous medium; and removing the organic solvent from the phase-inverted emulsion by reduced pressure distillation.

In the resin particle dispersion production method according to the present exemplary embodiment, a specific reduced pressure distillation device is used to perform the reduced pressure distillation, and the aqueous medium is added to the phase-inverted emulsion contained in the distillation tank during the reduced pressure distillation.

The specific reduced pressure distillation device is a reduced pressure distillation device including:
- a distillation tank that contains the phase-inverted emulsion;
- a heating unit that heats a tank wall of the distillation tank by causing a heated fluid to flow inside the heating unit; and
- an agitating unit disposed inside the distillation tank, the agitating unit including an agitating shaft and one or a plurality of gutter-shaped agitation impellers that are attached to the agitating shaft, rotate to agitate the phase-inverted emulsion, and draw up the phase-inverted emulsion to form a liquid film of the phase-inverted emulsion on a heat transfer surface of the distillation tank in a portion above the liquid level of the phase-inverted emulsion.

With the resin particle dispersion production method according to the present exemplary embodiment, the degree of reduction in the yield of the resin particle dispersion that is caused by adhesion of the resin to the inner wall surface of the distillation tank is reduced. The reason for this may be as follows.

The resin particle dispersion is produced, for example, by dissolving the resin in an organic solvent, mixing the resulting solution with water to cause phase inversion emulsification to occur to thereby disperse the resin finely in the aqueous medium, and then removing the organic solvent by reduced pressure distillation.

It is known that the reduced pressure distillation is performed using the specific reduced pressure distillation device.

In the specific reduced pressure distillation device, the gutter-shaped agitation impellers rotate to agitate the phase-inverted emulsion and draw up the phase-inverted emulsion contained in the distillation tank (hereinafter referred to also as "the contained phase-inverted emulsion") to form a liquid film of the phase-inverted emulsion on the heat transfer surface of the distillation tank in a portion above the liquid level of the contained phase-inverted emulsion. By forming the liquid film of the phase-inverted emulsion on the heat transfer surface of the distillation tank, the area of contact between the phase-inverted emulsion and the heat transfer surface of the distillation tank can be maximized even when the volume of the phase-inverted emulsion is reduced because of evaporation of the organic solvent and the aqueous medium.

However, when the organic solvent and the aqueous medium evaporate during the reduced pressure distillation and the concentration of solids in the contained phase-inverted emulsion is increased, the concentration of solids in the liquid film of the phase-inverted emulsion formed on the heat transfer surface of the distillation tank is increased excessively because the organic solvent and the aqueous medium evaporate in the course of flowing down to the contained phase-inverted emulsion. In particular, the concentration of solids in the film near the liquid level of the contained phase-inverted emulsion tends to be excessively high. As the sold concentration increases, the viscosity of the liquid increases, and this causes adhesion of the resin to the heat transfer surface (i.e., the inner wall surface) of the distillation tank.

However, in the resin particle dispersion production method according to the present exemplary embodiment, the aqueous medium is added to the contained phase-inverted emulsion during the reduced pressure distillation. In this case, even when the organic solvent and the aqueous medium evaporate during the reduced pressure distillation, the concentration of solids in the phase-inverted emulsion is unlikely to increase excessively.

Therefore, in the liquid film near the liquid level of the contained phase-inverted emulsion, the concentration of solids in the phase-inverted emulsion is unlikely to increase excessively due to evaporation of the organic solvent and the aqueous medium, and the concentration of solids in the liquid film of the phase-inverted emulsion formed on the heat transfer surface of the distillation tank is unlikely to increase excessively. An excessive increase in the viscosity of the liquid film of the phase-inverted emulsion is thereby prevented, and the adhesion of the resin to the heat transfer surface (i.e., the inner wall surface) of the distillation tank is prevented.

It can therefore be inferred that, with the resin particle dispersion production method according to the present exemplary embodiment, the degree of reduction in the yield due to the adhesion of the resin to the inner wall surface of the distillation tank is reduced.

The resin particle dispersion production method according to the present exemplary embodiment will be described in detail.

(Resin Particle Dispersion Production Apparatus)

First, the outline of the production apparatus used for the resin particle dispersion production method according to the present exemplary embodiment will be described.

FIG. 1 is a schematic configuration diagram of an example of the production apparatus used for the resin particle dispersion production method according to the present exemplary embodiment.

The production apparatus shown in FIG. 1 includes an emulsification device 100, a reduced pressure distillation device 200, and a distillate collection device 300.

The emulsification device 100 includes, for example: an emulsification tank 102 to which the resin, a neutralizer, the organic solvent, and the aqueous medium are supplied to subject the resin to phase inversion emulsification; a heating unit 104 (i.e., a jacket) that heats the tank wall of the emulsification tank 102; and an agitating unit 106 that is disposed inside the emulsification tank 102 and used to perform the phase inversion emulsification.

Supply lines 108 that supply the resin, the neutralizer, the organic solvent, and the aqueous medium to the emulsification tank 102 are connected to the emulsification tank 102.

The reduced pressure distillation device 200 includes, for example: a distillation tank 202 that contains the phase-inverted emulsion; a heating unit 204 (i.e., a jacket) that heats the tank wall of the distillation tank 202 by causing a heated fluid to flow inside the heating unit; and an agitating unit 206 disposed inside the distillation tank 202 and used to agitate the phase-inverted emulsion contained in the distillation tank 202. The distillation tank 202 is connected to a vacuum pump for reducing the pressure inside the distillation tank 202 through a solvent discharge line 304 and a condenser 306 described later.

The details of the reduced pressure distillation device 200 will be described later.

The emulsification tank 102 and the distillation tank 202 are connected using an emulsion transfer line 112 via a pump 110.

The distillate collection device 300 includes, for example: a collection tank 302; the solvent discharge line 304 connected at one end to the distillation tank 202 and at the other end to the collection tank 302; the condenser 306 that is disposed in the solvent discharge line 304 and condenses the organic solvent and the aqueous medium evaporated from the phase-inverted emulsion contained in the distillation tank 202; and a vacuum pump 308 used to evacuate the distillation tank 302 via the solvent discharge line 304 and the condenser 306.

In the production apparatus shown in FIG. 1, the resin, the neutralizer, the organic solvent, and the aqueous medium are supplied through the respective supply lines 108 to the emulsification tank 102 in the emulsification device 100, and the resin is subjected to phase inversion emulsification while the mixture is heated using the heating unit 104 and agitated using the agitating unit 106 to thereby obtain a phase-inverted emulsion.

Next, the pump 110 is used to transfer the phase-inverted emulsion from the emulsification tank 102 to the distillation tank 202 through the emulsion transfer line 112.

Next, the phase-inverted emulsion in the reduced pressure distillation device 200 is heated using the heating unit 204 and agitated using the agitating unit 206 to evaporate the organic solvent and the aqueous medium from the phase-inverted emulsion while the vacuum pump 308 is used to evacuate the distillation tank 202.

In the distillate collection device 300, the organic solvent and the aqueous medium evaporated from the phase-inverted emulsion are transferred to the condenser 306 through the solvent discharge line 304, condensed in the condenser, and collected in the collection tank 302.

When the organic solvent has been removed from the phase-inverted emulsion, a resin particle dispersion is obtained.

The production apparatus used for the resin particle dispersion production method according to the present exemplary embodiment is not limited to the apparatus described above, and any well-known apparatus can be used so long as the apparatus has a reduced pressure distillation device 200 corresponding to the specific reduced pressure distillation device described above.

Next, the details of the steps in the resin particle dispersion production method according to the present exemplary embodiment will be described. In the following description, the numerals will be omitted.

(Phase-Inverted Emulsion Preparation Step)

In the phase-inverted emulsion preparation step, the phase-inverted emulsion is prepared by subjecting the resin to phase inversion emulsification using the organic solvent and the aqueous medium.

The phase-inverted emulsion is obtained by a phase inversion emulsification method.

In the phase inversion emulsification method, the aqueous medium (i.e., the W phase) is added to an oil phase dispersion (i.e., a resin solution used as the O phase) that is a continuous phase containing the resin dissolved in an organic solvent capable of dissolving the resin to thereby subject the resin to conversion (i.e., phase inversion) from W/O to O/W. The oil phase dispersion is thereby converted to a discontinuous phase, and the resin is dispersed as particles in the aqueous medium.

Examples of the method for producing the phase-inverted emulsion include the following methods.

1) The resin is dissolved in the organic solvent, and the neutralizer is added to the obtained resin solution to neutralize the resin. Then the aqueous medium is added to the resin solution to perform phase inversion emulsification.
2) The resin is dissolved in a solvent containing the organic solvent and the neutralizer to neutralize the resin, and the aqueous medium is added to the resin solution to perform phase inversion emulsification.
3) The resin is dissolved in a solvent containing the organic solvent, the neutralizer, and the aqueous medium to neutralize the resin, and then the aqueous medium is added to the resin solution to perform phase inversion emulsification.

The phase-inverted emulsion is produced using a well-known emulsification device such as an emulsification tank equipped with agitation impellers.

When the resin is dissolved in the organic solvent, the aqueous medium and the neutralizer may be mixed with the resin and the organic solvent.

No particular limitation is imposed on the order of addition of the resin and the organic solvent to the emulsification tank. When the resin easily dissolves in the organic solvent, the resin may be added after all the organic solvent or part of the organic solvent has been added, from the viewpoint of dissolving time.

The tube used to add the resin to the emulsification tank can be freely selected in consideration of, for example, the diameter of the pulverized resin to be added. For example, to prevent dust particles from flying during addition of the resin, a tube that can be lowered to a lower portion of the emulsification tank may be used.

No particular limitation is imposed on the position, number, and shape of nozzles used to add water to the resin solution obtained by dissolving the resin to the organic solvent. For example, the nozzles may be immersed in the solution. When a large-scale facility is used, two or more tubes may be used to add water, or a nozzle having a showerhead may be used to add water from an upper portion of the emulsification tank such that the water is sprayed over the surface of the solution.

—Resin—

Any resin that can undergo phase inversion emulsification can be used.

Examples of the resin include: vinyl-based resins composed of homopolymers of monomers such as styrenes (such as styrene, p-chlorostyrene, and α-methylstyrene), (meth) acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene); and vinyl-based resins composed of copolymers of combinations of two or more of the above monomers.

Other examples of the resin include: non-vinyl-based resins such as epoxy resins, polyester resins, polyurethane resins, polyamide resins, cellulose resins, polyether resins, and modified rosins; mixtures of the non-vinyl-based resins and the above-described vinyl-based resins; and graft polymers obtained by polymerizing a vinyl-based monomer in the presence of any of these resins.

One of these resins may be used alone, or two or more of them may be used in combination.

The resin may have a polar group such as a carboxyl group, a sulfonic acid group, or a hydroxy group. In particular, the resin may have an acid value. With such a resin, the viscosity of the solution is likely to increase when the polar groups form ionic bonds to cause the concentration of solids to increase, and adhesion of the resin to the inner wall surface of the distillation tank is likely to occur. However, in the resin particle dispersion production method according to the present exemplary embodiment, the degree of adhesion of the resin to the inner wall surface of the distillation tank is reduced, and the degree of reduction in the yield due to the adhesion of the resin can be reduced.

The resin used may be an amorphous resin. However, a crystalline resin (such as a crystalline polyester resin) may be used.

The amorphous resin exhibits only a stepwise endothermic change instead of a clear endothermic peak in thermal analysis measurement using differential scanning calorimetry (DSC), is a solid at room temperature, and is thermoplastic at temperature equal to or higher than its glass transition temperature.

The crystalline resin exhibits a clear endothermic peak instead of a stepwise endothermic change in the differential scanning calorimetry (DSC).

Specifically, the crystalline resin means that, for example, the half width of the endothermic peak measured at a heating rate of 10° C./minute is 10° C. or less, and the amorphous resin means a resin in which the half width exceeds 10° C. or a resin in which a clear endothermic peak is not observed.

The amorphous resin will be described.

Examples of the amorphous resin include well-known amorphous resins such as amorphous polyester resins, amorphous vinyl resins (such as styrene-acrylic resins), epoxy resins, polycarbonate resins, and polyurethane resins. Of these, amorphous polyester resins, and amorphous vinyl resins (particularly styrene-acrylic resins) resins are preferred, and amorphous polyester resins are more preferred.

The amorphous resin may be a combination of an amorphous polyester resin and a styrene-acrylic resin. Moreover, the amorphous resin used may be an amorphous resin having an amorphous polyester resin segment and a styrene acrylic resin segment.

—Amorphous Polyester Resin

The amorphous polyester resin is, for example, a polycondensation product of a polycarboxylic acid and a polyhydric alcohol. The amorphous polyester resin used may be a commercial product or a synthesized product.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acids, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl (having, for example, 1 to 5 carbon atoms) esters thereof. In particular, the polycarboxylic acid may be an aromatic dicarboxylic acid.

The polycarboxylic acid used may be a combination of a dicarboxylic acid and a tricarboxylic or higher polycarboxylic acid having a crosslinked or branched structure. Examples of the tricarboxylic or higher polycarboxylic acid include trimellitic acid, pyromellitic acid, anhydrides thereof, and lower alkyl (having, for example, 1 to 5 carbon atoms) esters thereof.

One of these polycarboxylic acids may be used alone, or two or more of them may be used in combination.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). In particular, the polyhydric alcohol is, for example, preferably an aromatic diol or an alicyclic diol and more preferably an aromatic diol.

The polyhydric alcohol used may be a combination of a diol and a trihydric or higher polyhydric alcohol having a crosslinked or branched structure. Examples of the trihydric or higher polyhydric alcohol include glycerin, trimethylolpropane, and pentaerythritol.

One of these polyhydric alcohols may be used alone, or two or more of them may be used in combination.

The amorphous polyester resin is obtained by a well-known production method. Specifically, the amorphous polyester resin is obtained, for example, by the following method. The polymerization temperature is set to from 180° C. to 230° C. inclusive. If necessary, the pressure inside the reaction system is reduced, and the reaction is allowed to proceed while water and alcohol generated during condensation are removed. When the raw material monomers are not dissolved or not compatible with each other at the reaction temperature, a high-boiling point solvent may be added as a solubilizer to dissolve the monomers. In this case, the polycondensation reaction is performed while the solubilizer is removed by evaporation. When a monomer with poor compatibility is present during the copolymerization reaction, the monomer with poor compatibility and an acid or an alcohol to be polycondensed with the monomer are condensed in advance, and then the resulting polycondensation product and the rest of the components are subjected to polycondensation.

The properties of the resin will be described.

The acid value of the resin is preferably from 8 mg KOH/g to 20 mg KOH/g inclusive and more preferably from 10 mg KOH/g to 16 mg KOH/g inclusive.

The acid value is determined by a neutralization titration method specified in JIS K0070 (1992). Specifically, the acid value is determined as follows.

An appropriate amount of a sample is collected, and 100 mL of a solvent (a solution mixture of diethyl ether/ethanol) and a few drops of an indicator (phenolphthalein solution) are added. Then the mixture is well-shaken in a water bath until the sample is completely dissolved. The mixture is titrated with a 0.1 mol/L potassium hydroxide ethanol solution. The point when the light red color of the indicator does not disappear for 30 seconds is defined as the end point. The acid value is denoted as A, and the weight of the sample is denoted as S (g). The volume of the 0.1 mol/L potassium hydroxide ethanol solution used for the titration is denoted as B (mL), and the factor of the 0.1 mol/L potassium hydroxide ethanol solution is denoted as f. Then the acid value is computed as $A=(B \times f \times 5.611)/S$.

The glass transition temperature (Tg) of the resin is preferably from 50° C. to 80° C. inclusive and more preferably from 50° C. to 65° C. inclusive.

The glass transition temperature is measured using a differential scanning calorimeter (DSC3110 manufactured by Mac Science Co., Ltd., thermal analysis system 001) according to JIS 7121-1987. The melting point of a mixture of indium and zinc is used to correct the temperature of a detection unit of the above apparatus, and the heat of fusion of indium is used to correct the amount of heat. A sample is placed in an aluminum pan. The aluminum pan with the sample placed therein and an empty reference pan are set in the apparatus, and the measurement is performed at a heating rate of 10° C./min.

The glass transition temperature is defined as the temperature at the intersection of the base line in an endothermic portion in the DSC curve obtained by the measurement and an extension of a rising line.

The weight average molecular weight (Mw) of the resin is preferably from 5000 to 1000000 inclusive and more preferably from 7000 to 500000 inclusive.

The number average molecular weight (Mn) of the resin may be from 2000 to 100000 inclusive.

The molecular weight distribution Mw/Mn of the resin is preferably from 1.5 to 100 inclusive and more preferably from 2 to 60 inclusive.

The weight average molecular weight and the number average molecular weight are measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

No particular limitation is imposed on the amount of the resin used, and the amount may be appropriately selected according to the concentration of solids in the resin particle dispersion to be obtained.

—Neutralizer—

Examples of the neutralizer include basic compounds capable of neutralizing polar groups in the resin such as carboxyl groups, sulfonic acid groups, or hydroxy groups.

Specific examples of the neutralizer include organic bases and inorganic alkalis.

Examples of the organic base include triethanolamine, diethanolamine, N-methyldiethanolamine, and dimethylethanolamine.

Examples of the inorganic alkali include hydroxides of alkali metals (such as sodium hydroxide, lithium hydroxide, and potassium hydroxide), carbonates (such as sodium carbonate and sodium hydrogencarbonate), and ammonia.

To prevent hydrolysis of the resin, the neutralizer is preferably an amine, which is a weak base, and more preferably ammonia. Particularly preferably, ammonia in the form of an aqueous ammonia solution is added.

The rate of neutralization of the resin with the neutralizer is 60% or more and less than 150%. From the viewpoint of improving the yield and narrowing the size distribution, the neutralization rate is preferably 60% or more and less than 145% and still more preferably 65% or more and 140% or less.

Specifically, the neutralizer is used such that the rate of neutralization of the resin falls within the above range.

The rate of neutralization of the resin is measured as follows.

The acid value of the resin is denoted as AV [mg-KOH/g-resin], and the valence of the neutralizer (i.e., the basic material) added is denoted as n. The molecular weight of the neutralizer (i.e., the basic material) added is denoted as Mwb. The amount of the neutralizer (i.e., the basic material) added per 1 g of the resin is denoted as mb [g]. Then the rate of neutralization of the resin is computed using the following formula.

The rate of neutralization of the resin [%]=$mb \times n \times 56.1/Mwb/AV \times 1000$ —Organic Solvent—

Examples of the organic solvent include well-known solvents used for phase inversion emulsification.

From the viewpoint of improving the solubility of the resin, the organic solvent may contain at least one organic solvent selected from the group consisting of esters and ketones and at least one organic solvent selected from the group consisting of alcohols.

Examples of the ester include ethyl acetate, butyl acetate, propyl acetate, and isopropyl acetate.

Examples of the ketone include acetone, methyl ethyl ketone, cyclohexanone, butanone, and methyl isobutyl ketone.

Examples of the alcohol include methanol, ethanol, isopropyl alcohol, n-propanol, n-butanol, diacetone alcohol, and 2-ethylhexanol.

—Aqueous Medium—

The aqueous medium used is, for example, water (such as distilled water or ion exchanged water).

The amount of water added to the oil phase medium prepared by dissolving the resin in the organic solvent is set to, for example, an amount that allows phase inversion emulsification to proceed and the amount of waste generated to decrease.

Specifically, the amount of water added is preferably from 50% by mass to 2000% by mass inclusive and more preferably from 100% by mass to 1000% by mass inclusive based on the mass of the resin.

(Organic Solvent Removal Step)

In the organic solvent removal step, the organic solvent is removed from the phase-inverted emulsion by reduced pressure distillation.

Figure 2:
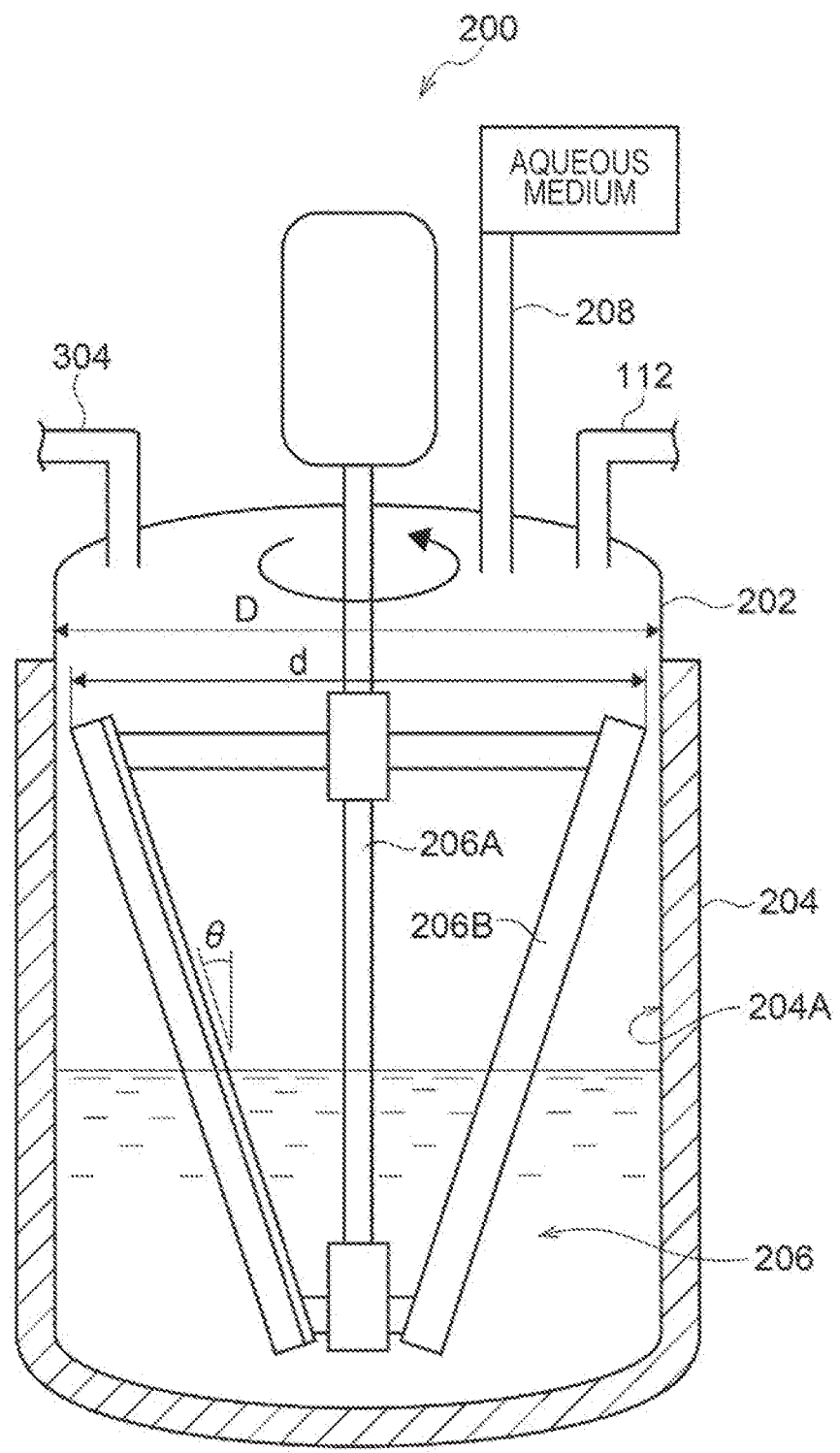
FIG. 2 is a schematic configuration diagram of an example of a reduced pressure distillation device used for the resin particle dispersion production method according to the exemplary embodiment.

The reduced pressure distillation is performed using the reduced pressure distillation device 200 shown in FIG. 2.

FIG. 2 is a schematic configuration diagram showing an example of the reduced pressure distillation device 200 used for the resin particle dispersion production method according to the present exemplary embodiment.

The reduced pressure distillation device 200 shown in FIG. 2 includes the distillation tank 202, the heating unit 104 (a so-called jacket), the agitating unit 206, and an aqueous medium supply line 208.

The distillation tank 202 is a tank containing the phase-inverted emulsion and used to subject the phase-inverted emulsion to reduced pressure distillation.

Among the inner wall surfaces of the distillation tank 202, a surface facing the heating unit 204 is referred to as a heat transfer surface 204A. Specifically, the heat transfer surface of the distillation tank 202 is the surface among its inner wall surfaces that corresponds to the heating unit 204.

The distillation tank 202 is connected to each of the emulsion transfer line 112 and the solvent discharge line 304 (see FIG. 1).

The heating unit 204 heats the tank wall of the distillation tank 202 by causing a heated fluid to flow inside the heating unit 204.

The heating unit 204 is disposed, for example, so as to extend from the bottom of the distillation tank 202 to its side surface.

The heating unit 204 can have any well-known structure so long as it can heat the tank wall of the distillation tank 202 until the temperature of the phase-inverted emulsion contained in the distillation tank 202 reaches a target temperature.

The heated fluid introduced into the heating unit 204 may be, for example, water vapor, heated water, etc.

The agitating unit 206 is disposed inside the distillation tank 202 and agitates the phase-inverted emulsion contained in the distillation tank 202.

The agitating unit 206 includes an agitating shaft 206A and one or a plurality of gutter-shaped agitation impellers 206B attached to the agitating shaft.

The agitating shaft 206A is formed, for example, from a cylindrical member or a circular columnar member. The agitating shaft 206A is generally disposed such that its axial direction is along the vertical.

The gutter-shaped agitation impellers 206B are attached to the agitating shaft 206A, rotate to agitate the phase-inverted emulsion, and draw up the phase-inverted emulsion to form a liquid film of the phase-inverted emulsion on the heat transfer surface 204A of the distillation tank 202 in a portion above the liquid level of the phase-inverted emulsion.

The gutter-shaped agitation impellers 206B each have a flow channel (not shown) for the phase-inverted emulsion and are disposed such that the longitudinal direction of each flow channel is inclined with respect to the agitating shaft 206A. The gutter-shaped agitation impellers 206B draw up the phase-inverted emulsion through the flow channels by utilizing the centrifugal force of the rotation of the agitating shaft 206A.

The gutter-shaped agitation impellers 206B used are pipes having a circular or polygonal cylindrical shape or half pipes having a circular or polygonal semi-cylindrical shape or a V-shaped cross section. The gutter-shaped agitation impellers 206B may be agitation impellers each having opposite end portions composed of half pipes and a central portion composed of a pipe.

The installation angle θ [°] of each gutter-shaped agitation impeller 206B with respect to the agitating shaft 206A, the number of rotations N [rpm] of the agitating shaft 206A, the inner diameter D [m] of the distillation tank 202, and the maximum diameter d [m] of the rotation trajectory of the gutter-shaped agitation impellers 206B may satisfy the following formulas 1 to 4.

$$10 \leq \theta \leq 45 \qquad \text{Formula 1}$$

$$14 \leq N \cdot \sin \theta \leq 60 \qquad \text{Formula 2}$$

$$0.4 \leq D \leq 5 \qquad \text{Formula 3}$$

$$0.75 \leq d/D \leq 0.95 \qquad \text{Formula 4}$$

The value of "N·sin θ" represents the centrifugal force generated by the rotation of the gutter-shaped agitation impellers 206B. When formulas 1 to 2 are satisfied, a good liquid film of the phase-inverted emulsion tends to be formed on the heat transfer surface 204A of the distillation tank 202 while spattering of the phase-inverted emulsion is prevented.

When "D" and "d/D" satisfy formulas 3 to 4, the distance from a forward end of each gutter-shaped agitation impeller 206B to the heat transfer surface 204A of the distillation tank 202 is appropriate. In this case, a good liquid film of the phase-inverted emulsion tends to be formed while spattering of the phase-inverted emulsion is prevented.

The structure of the agitating unit 206 is not limited to the above structure, and any well-known structure may be used so long as it includes the gutter-shaped agitation impellers 206B. Specifically, for example, a well-known agitator called a wall wetter may be used.

The aqueous medium supply line 208 is a supply line for adding the aqueous medium to the phase-inverted emulsion contained in the distillation tank 202 during reduced pressure distillation of the phase-inverted emulsion.

To add the aqueous medium using the aqueous medium supply line 208, a well-known addition method such as dropwise addition from a pipe or addition from a shower nozzle may be used. The aqueous medium may be added continuously or intermittently.

The aqueous medium used is water (such as distilled water or ion exchanged water).

In the reduced pressure distillation device 200 shown in FIG. 2, the phase-inverted emulsion contained in the distillation tank 202 is heated by the heating unit 204 through the heat transfer surface 204A of the distillation tank 202 under reduced pressure. At the same time, the phase-inverted emulsion is agitated by the agitating unit 206. The reduced pressure distillation is performed using the agitating unit 206. Specifically, while the gutter-shaped agitation impellers 206B are used to agitate the phase-inverted emulsion and draw up the phase-inverted emulsion to form a liquid film of the phase-inverted emulsion on the heat transfer surface 204A of the distillation tank 202 in a portion above the liquid level of the phase-inverted emulsion, the organic solvent in the phase-inverted emulsion is evaporated.

During the reduced pressure distillation, the aqueous medium is added to the phase-inverted emulsion contained in the distillation tank 202 using the aqueous medium supply line 208.

In the reduced pressure distillation device 200 shown in FIG. 2, the agitating unit including the gutter-shaped agitation impellers 206B is used to agitate the phase-inverted emulsion. When the agitating unit including the gutter-shaped agitation impellers 206B is used for the phase inversion emulsification, dissolution of the resin in the organic solvent may be insufficient in some cases because the agitating power of the agitating unit is weak. In this case, adhesion of the resin to the inner wall surface of the distillation tank may be facilitated.

Therefore, the phase-inverted emulsion is produced in the separate emulsification tank 102 while agitated using an agitating unit with strong agitating power and then transferred from the emulsification tank 102 to the distillation tank 202, and then reduced pressure distillation is performed. In this manner, the degree of adhesion of the resin to the inner wall surface of the distillation tank is reduced, and the yield tends to increase.

The structure of the reduced pressure distillation device 200 shown in FIG. 2 is not limited to the above structure, and any well-known reduced pressure distillation device may be used so long as it includes the aqueous medium supply line 208.

Next, the details of the organic solvent removal step will be described. In the following description, the numerals will be omitted.

In the organic solvent removal step, from the viewpoint of reducing the degree of adhesion of the resin particles to the inner wall surface of the distillation tank, the aqueous medium may be added to the phase-inverted emulsion contained in the distillation tank such that the concentration of solids in the phase-inverted emulsion is maintained in the range of 25% by mass to 45% by mass (preferably in the range of 25% by mass to 40% by mass) during the reduced pressure distillation.

By adding the aqueous medium to the phase-inverted emulsion contained in the distillation tank such that the concentration of solids in the phase-inverted emulsion is maintained in the above range, an increase in the viscosity of the liquid film formed on the heat transfer surface of the distillation tank is prevented, and the degree of adhesion of the resin can be easily reduced.

The concentration of the solids in the phase-inverted emulsion is a solid concentration computed from the mass and the solid concentration of the phase-inverted emulsion at the start of the reduced pressure distillation, the mass of the distillate collected during the reduced pressure distillation, and the mass of the aqueous medium added during the reduced pressure distillation. Specifically, the mass of the resin in the phase-inverted emulsion at the start of the reduced pressure distillation is denoted as $Wr$ [kg], and the mass of the resin particle dispersion after the phase inversion emulsification is denoted as $Wt$ [kg]. The mass of the distillate collected during the reduced pressure distillation is denoted as $Wv$, and the mass of the aqueous medium added during the reduced pressure distillation is denoted as $Ww$ [kg]. Then the solid concentration is computed from the following formula.

$$\text{solid concentration} = Wr/(Wt-Wv+Ww) \qquad \text{Formula:}$$

The mass of the distillate collected during the reduced pressure distillation is measured using a weight scale such as a load cell or an integrated value of a flow meter.

In the organic solvent removal step, from the viewpoint of reducing the degree of adhesion of the resin particles to the inner wall surface of the distillation tank, the aqueous medium may be added to the phase-inverted emulsion contained in the distillation tank such that the maximum viscosity of the phase-inverted emulsion is maintained in the range of 30 mPa·sec or less (preferably from 10 mPa·sec to 25 mPa·sec inclusive) during the reduced pressure distillation.

By adding the aqueous medium to the phase-inverted emulsion contained in the distillation tank such that the maximum viscosity of the phase-inverted emulsion is maintained in the above range, an increase in the viscosity of the liquid film formed on the heat transfer surface of the distillation tank is prevented, and the degree of adhesion of the resin can be easily reduced.

The viscosity of the phase-inverted emulsion is measured using a vibration-type viscometer (VM-10A manufactured by SEKONIC CORPORATION).

In the organic solvent removal step, from the viewpoint of reducing the degree of adhesion of the resin particles to the inner wall surface of the distillation tank, the rate of distillate collection per unit area of the heat transfer surface of the distillation tank at the time of addition of the aqueous medium to the phase-inverted emulsion contained in the distillation tank during the reduced pressure distillation may be 60 kg/h/m$^2$ or less (preferably from 10 kg/h/m$^2$ to 55 kg/h/m$^2$).

By adding the aqueous medium to the phase-inverted emulsion contained in the distillation tank when the rate of distillate collection per unit area of the heat transfer surface of the distillation tank is in the above range, an increase in the viscosity of the liquid film formed on the heat transfer surface of the distillation tank is prevented, and the degree of adhesion of the resin can be easily reduced.

The rate of distillate collection per unit area of the heat transfer surface of the distillation tank is computed as follows. A change in the mass of the distillate collected per unit time is measured, or the rate of distillate collection [kg/h] per unit time is measured using a flowmeter disposed in the tubing. Then the change in the mass or the rate of distillate collection is divided by the area [m$^2$] of the heat transfer surface of the distillation tank.

In the organic solvent removal step, from the viewpoint of preventing coarsening of the resin particles, the temperature $T1$ of the phase-inverted emulsion at the time of addition of the aqueous medium to the phase-inverted emulsion contained in the distillation tank during the reduced pressure distillation may be equal to or higher than 25° C. and equal to or lower than (the glass transition temperature Tg of the resin −1° C.) (preferably equal to or higher than 30° C. and equal to or lower than (the glass transition temperature Tg of the resin −10° C.)), and the temperature $T2$ of the heated fluid flowing inside the heating unit may be 95° C. or lower (preferably 50° C. or higher and 95° C. or lower). The relation between T1 and T2 may be T1<T2 (preferably T2−T1 is from 15° C. to 55° C. inclusive).

By adding the aqueous medium to the phase-inverted emulsion contained in the distillation tank under the above conditions, a local temperature change is unlikely to occur when the aqueous medium is added, and the stability of the resin particles is maintained. Therefore, coarsening of the resin particles due to fusion of the resin particles is prevented.

The temperature T2 of the heated fluid flowing inside the heating unit is the temperature of the heated fluid at an introduction port for introducing the heated fluid into the heating unit.

In the organic solvent removal step, from the viewpoint of preventing coarsening of the resin particles, the temperature T3 of the aqueous medium added to the phase-inverted emulsion contained in the distillation tank during the reduced pressure distillation may be equal to or lower than (the glass transition temperature Tg of the resin −1° C.) (preferably equal to or lower than (the glass transition temperature Tg of the resin −10° C.)).

When the temperature T3 of the aqueous medium is equal to or lower than (the glass transition temperature Tg of the resin −1° C.), coarsening of the toner particles caused by fusion of the toner particles due to the heat of the aqueous medium added can be prevented.

In the organic solvent removal step, from the viewpoint of reducing the amount of the distillate collected, the temperature T3 of the aqueous medium may be equal to or higher than 10° C. and equal to or lower than (the glass transition temperature Tg of the resin −1° C.) (preferably equal to or higher than 15° C. and equal to or lower than (the glass transition temperature Tg of the resin −1° C.)).

When the temperature T3 of the aqueous medium is 15° C. or higher, a reduction in the temperature of the phase-inverted emulsion during the reduced pressure distillation is prevented, and the amount of the aqueous medium in the distillate is reduced, so that the amount of the distillate collected from the distillation tank is reduced. However, to prevent freezing of the aqueous medium, the temperature T3 of the aqueous medium may be 5° C. or higher (preferably 20° C. or higher).

In the organic solvent removal step, from the viewpoint of reducing the amount of the distillate collected, the rate of addition of the aqueous medium added to the phase-inverted emulsion contained in the distillation tank during the reduced pressure distillation may be such that the fluctuations of the temperature T1 of the phase-inverted emulsion contained in the distillation tank when the aqueous medium is added to the phase-inverted emulsion during the reduced pressure distillation are within ±5 (preferably ±3).

When the rate of addition of the aqueous medium satisfies the above condition, the degree of change in the temperature of the phase-inverted emulsion caused by the addition of the aqueous medium is reduced, and the amount of the aqueous medium in the distillate is reduced, so that the amount of the distillate collected from the distillation tank is reduced.

The rate of addition of the aqueous medium is, for example, from 0.5 kg/hr to 3.5 kg/hr inclusive per unit resin weight.

In the organic solvent removal step described above, the organic solvent is removed from the phase-inverted emulsion, and a resin particle dispersion containing the resin particles dispersed therein is thereby obtained.

After the removal of the organic solvent, the collected organic solvent, the collected neutralizer, the collected aqueous medium, etc. may be re-used for the production of the phase-inverted emulsion. In this manner, the cost and the environmental load may be reduced.

A surfactant may be added to the obtained resin particle dispersion.

When the resin particle dispersion contains a surfactant, the dispersibility of the resin particles may be increased, and the storage stability of the dispersion may be improved.

Examples of the surfactant include various surfactants such as anionic surfactants, amphoteric surfactants, cationic surfactants, and nonionic surfactants.

Of these, anionic surfactants may be used from the viewpoint of improving the storage stability of the resin particle dispersion.

Examples of the anionic surfactant include carboxylic acid-type anionic surfactants, sulfate-type anionic surfactants, sulfonate-type anionic surfactants, and phosphate-type anionic surfactants.

Specific examples of the anionic surfactant include fatty acid salts, rosin acid salts, naphthenic acid salts, ether carboxylic acid salts, alkenyl succinic acid salts, primary alkyl sulfates, secondary alkyl sulfates, polyoxyethylene alkyl sulfates, polyoxyethylene alkylphenyl sulfates, monoacylglycerol sulfates, acylamino sulfates, sulfated oils, sulfated fatty acid alkyl esters, α-olefin sulfonates, secondary alkane sulfonates, α-sulfofatty acid salts, acyl isethionates, dialkyl sulfosuccinates, alkylbenzenesulfonates, alkylnaphthalenesulfonates, alkyl diphenyl ether disulfonates, petroleum sulfonates, lignin sulfonates, alkyl phosphates, polyoxyethylene alkyl phosphates, polyoxyethylene alkylphenyl phosphates, perfluoroalkyl carboxylates, perfluoroalkyl sulfonates, and perfluoroalkyl phosphates.

Of these, sulfate-type or sulfonate-type anionic surfactants are more preferable, and sulfonate-type anionic surfactants are particularly preferable, from the viewpoint of improving the storage stability of the resin particle dispersion.

From the viewpoint of improving the storage stability of the resin particle dispersion, the content of the surfactant is preferably from 0.1% by mass to 10% by mass inclusive and more preferably from 0.5% by mass to 5% by mass inclusive based on the mass of the resin.

(Properties of Resin Particle Dispersion)

The volume average particle diameter of the resin particles in the resin particle dispersion according to the present exemplary embodiment is preferably from 65 nm to 220 nm inclusive and more preferably from 90 nm to 200 nm inclusive.

In the resin particle dispersion according to the present exemplary embodiment, even when the volume average particle diameter of the resin particles is in the above range, the yield is high, and the resin particle dispersion has a narrow particle size distribution.

The volume average particle diameter of the resin particles is measured as follows. A particle size distribution measured using a laser diffraction particle size measurement apparatus (e.g., LA-700 manufactured by HORIBA Ltd.) is used and divided into different particle diameter ranges (channels), and a cumulative volume distribution is computed from the small particle diameter side. The particle diameter at which the cumulative frequency is 50% relative to the total number of particles is measured as the volume average particle diameter D50v.

In the resin particle dispersion according to the present exemplary embodiment, the content of the residual organic solvent is preferably from 25 ppm to 3000 ppm inclusive and more preferably from 100 ppm to 1500 ppm inclusive. The term "ppm" means the mass ratio in the resin particle dispersion after removal of the organic solvent.

When the content of the residual organic solvent in the resin particle dispersion is 25 ppm or more, the degree of reduction in the yield due to the adhesion of the resin to the inner wall surface of the distillation tank can be easily reduced. This may be because, since the resin particles containing the organic solvent have some flexibility, the dispersion stability against foam breaking on the tank wall surface and stress due to an increase in the concentration of solids can be easily maintained.

When the content of the residual organic solvent in the resin particle dispersion is 3000 ppm or less, aggregation of the resin particles may be prevented, and the storage stability of the resin particle dispersion may be improved.

To adjust the content of the residual organic solvent to the above range, for example, a method may be used in which the amount of the distillate to be collected is computed in advance using the amount of the phase-inverted emulsion before distillation and the amount of the organic solvent component contained in the phase-inverted emulsion.

The concentration of solids in the resin particle dispersion according to the present exemplary embodiment may be appropriately selected as needed. The solid concentration is preferably from 1% by mass to 60% by mass inclusive, more preferably from 5% by mass to 50% by mass inclusive, and particularly preferably from 10% by mass to 50% by mass inclusive.

(Applications)

The resin particle dispersion production method according to the present exemplary embodiment is typically used as a method for producing a resin particle dispersion for a toner.

Other examples of the application of the method include methods for producing resin particle dispersions for inkjet inks, cosmetics, powder coatings, various coatings, and electronic paper inks.

<Toner Production Method/Toner>

A toner production method according to an exemplary embodiment includes the steps of:

forming aggregated particles by aggregating, in a dispersion containing resin particles in a resin particle dispersion obtained by the resin particle dispersion production method according to the preceding exemplary embodiment, at least the resin particles (this step is hereinafter referred to as an aggregated particle forming step);

and fusing and coalescing the aggregated particles by heating an aggregated particle dispersion containing the aggregated particles dispersed therein to thereby form toner particles (this step is hereinafter referred to as a fusion/coalescence step).

A toner according to an exemplary embodiment contains toner particles obtained by the toner production method according to the above exemplary embodiment.

The above steps will next be described in detail.

In the following description, a method for obtaining toner particles containing a coloring agent and a release agent will be described, but the coloring agent and the release agent are used optionally. Of course, additional additives other than the coloring agent and the release agent may be used.

—Resin Particle Dispersion Preparing Step—

In a resin particle dispersion preparing step, a resin particle dispersion, a coloring agent particle dispersion, and a release agent particle dispersion are prepared.

—Resin Particle Dispersion—

The resin particle dispersion is produced using the resin particle dispersion production method according to the preceding exemplary embodiment.

However, a resin particle dispersion other than the resin particle dispersion obtained using the resin particle dispersion production method according to the preceding exemplary embodiment may also be used.

—Coloring Agent Particle Dispersion

The coloring agent particle dispersion is a dispersion obtained by dispersing a coloring agent in at least an aqueous medium.

Examples of the coloring agent include: various pigments such as carbon black, chrome yellow, Hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as acridine-based dyes, xanthene-based dyes, azo-based dyes, benzoquinone-based dyes, azine-based dyes, anthraquinone-based dyes, thioindigo-based dyes, dioxazine-based dyes, thiazine-based dyes, azomethine-based dyes, indigo-based dyes, phthalocyanine-based dyes, aniline black-based dyes, polymethine-based dyes, triphenylmethane-based dyes, diphenylmethane-based dyes, and thiazole-based dyes.

One of these coloring agents may be used alone, or two or more of them may be used in combination.

The coloring agent is dispersed in an aqueous medium using a well-known method. For example, a rotary shearing-type homogenizer, a media-type disperser such as a ball mill, a sand mill, or an attritor, or a high-pressure counter collision-type disperser may be used. The coloring agent may be dispersed in the aqueous medium using a polar ionic surfactant and using a homogenizer to thereby produce the coloring agent particle dispersion.

The volume average particle diameter of the coloring agent is preferably 1 μm or less, more preferably 0.5 μm or less, and particularly preferably from 0.01 μm to 0.5 μm inclusive.

A dispersant may be added in order to improve the dispersion stability of the coloring agent in the aqueous medium to thereby reduce the energy of the coloring agent in the toner, and examples of the dispersant include rosin, rosin derivatives, coupling agents, and polymeric dispersants.

—Release Agent Particle Dispersion

The release agent particle dispersion is a dispersion obtained by dispersing a release agent in at least an aqueous medium.

Examples of the release agent include: hydrocarbon-based waxes; natural waxes such as carnauba wax, rice wax, and candelilla wax; synthetic and mineral/petroleum-based waxes such as montan wax; and ester-based waxes such as fatty acid esters and montanic acid esters. The release agent used is not limited to the above release agents.

One of these release agents may be used alone, or two or more of them may be used in combination.

The melting temperature of the release agent is preferably from 50° C. to 110° C. inclusive and more preferably from 60° C. to 100° C. inclusive.

The melting temperature is determined using a DSC curve obtained by differential scanning calorimetry (DSC) from "peak melting temperature" described in melting temperature determination methods in "Testing methods for transition temperatures of plastics" in JIS K7121-1987.

The release agent is dispersed in the aqueous medium using a well-known method. For example, a rotary shearing-type homogenizer, a media-type disperser such as a ball mill, a sand mill, or an attritor, or a high-pressure counter collision-type disperser may be used. The release agent may be dispersed in the aqueous medium using a polar ionic surfactant and using a homogenizer to thereby produce the release agent particle dispersion.

The volume average particle diameter of the release agent particles is preferably 1 μm or less and more preferably from 0.01 μm to 1 μm inclusive.

—Aggregated Particle Forming Step—

Next, the resin particle dispersion, the coloring agent particle dispersion, and the release agent particle dispersion are mixed.

Then the resin particles, the coloring agent particles, and the release agent particles are hetero-aggregated in the dispersion mixture to form aggregated particles containing the resin particles, the coloring agent particles, and the release agent particles and having diameters close to the diameters of target toner particles.

Specifically, for example, a flocculant is added to the dispersion mixture, and the pH of the dispersion mixture is adjusted to acidic (for example, a pH of from 2 to 5 inclusive). Then a dispersion stabilizer is optionally added, and the resulting mixture is heated to the glass transition temperature of the resin particles (specifically, for example, a temperature equal to higher than the glass transition temperature of the resin particles −30° C. and equal to or lower than the glass transition temperature −10° C.) to aggregate the particles dispersed in the dispersion mixture to thereby form aggregated particles.

In the aggregated particle forming step, for example, the flocculant is added at room temperature (e.g., 25° C.) while the dispersion mixture is agitated in a rotary shearing-type homogenizer. Then the pH of the dispersion mixture is adjusted to acidic (e.g., a pH of from 2 to 5 inclusive), and the dispersion stabilizer is optionally added. Then the resulting mixture is heated in the manner described above.

Examples of the flocculant include a surfactant with a polarity opposite to the polarity of the surfactant added to the dispersion mixture, inorganic metal salts, and divalent or higher polyvalent metal complexes. In particular, when a metal complex is used as the flocculant, the amount of the surfactant used can be reduced, and charging characteristics may be improved.

An additive that forms a complex with a metal ion in the flocculant or a similar bond may be optionally used. The additive used may be a chelating agent.

Examples of the inorganic metal salts include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

The chelating agent used may be a water-soluble chelating agent. Examples of the chelating agent include: oxycarboxylic acids such as tartaric acid, citric acid, and gluconic acid; iminodiacetic acid (IDA); nitrilotriacetic acid (NTA); and ethylenediaminetetraacetic acid (EDTA).

The amount of the chelating agent added is, for example, preferably from 0.01 parts by mass to 5.0 parts by mass inclusive and more preferably 0.1 parts by mass or more and less than 3.0 parts by mass based on 100 parts by mass of the resin particles.

—Fusion/Coalescence Step—

Next, the aggregated particle dispersion containing the aggregated particles dispersed therein is heated, for example, to a temperature equal to or higher than the glass transition temperature of the resin particles (e.g., a temperature higher by 10° C. to 30° C. than the glass transition temperature of the resin particles) to fuse and coalesce the aggregated particles to thereby form toner particles.

The toner particles are obtained through the above-described steps.

Alternatively, the toner particles may be produced through: the step of, after the preparation of the aggregated particle dispersion containing the aggregated particles dispersed therein, mixing the aggregated particle dispersion further with the resin particle dispersion containing the resin particles dispersed therein and then causing the resin particles to adhere to the surface of the aggregated particles to aggregate them to thereby form second aggregated particles; and the step of heating a second aggregated particle dispersion containing the second aggregated particles dispersed therein to fuse and coalesce the second aggregated particles to thereby form toner particles having a core-shell structure.

After completion of the fusion/coalescence step, the toner particles formed in the solution are subjected to a well-known washing step, a solid-liquid separation step, and a drying step to obtain dried toner particles.

From the viewpoint of chargeability, the toner particles may be subjected to displacement washing with ion exchanged water sufficiently in the washing step. No particular limitation is imposed on the solid-liquid separation step. From the viewpoint of productivity, suction filtration, pressure filtration, etc. may be performed in the solid-liquid separation step. No particular limitation is imposed on the drying step. From the viewpoint of productivity, freeze-drying, flash drying, fluidized drying, vibrating fluidized drying, etc. may be performed in the drying step.

The toner according to the present exemplary embodiment is produced, for example, by adding an external additive to the dried toner particles obtained and mixing them. The mixing may be performed, for example, using a V blender, a Henschel mixer, a Loedige mixer, etc. If necessary, coarse particles in the toner may be removed using a vibrating sieving machine, an air sieving machine, etc.

Examples of the external additive include inorganic particles. Examples of the inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surface of the inorganic particles used as the external additive may be subjected to hydrophobic treatment. The hydrophobic treatment is performed, for example, by immersing the inorganic particles in a hydrophobic treatment agent. No particular limitation is imposed on the hydrophobic treatment agent, and examples of the hydrophobic treatment agent include silane-based coupling agents, silicone oils, titanate-based coupling agents, and aluminum-based coupling agents. One of these may be used alone, or two or more of them may be used in combination.

The amount of the hydrophobic treatment agent is generally, for example, from 1 part by mass to 10 parts by mass inclusive based on 100 parts by mass of the inorganic particles.

Other examples of the external additive include resin particles (particles of resins such as polystyrene, polymethyl methacrylate (PMMA), and melamine resins) and cleaning activators (such as metal salts of higher fatty acids typified by zinc stearate and fluorine-based polymer particles).

The amount of the external additive added externally is, for example, preferably from 0.01% by mass to 5% by mass inclusive and more preferably from 0.01% by mass to 2.0% by mass inclusive relative to the mass of the toner particles.

—Properties of Toner—

In the toner according to the present exemplary embodiment, the toner particles may have a single layer structure or may be toner particles each having a so-called core-shell structure including a core (core particle) and a coating layer (shell layer) covering the core.

The toner particles having the core-shell structure may each include, for example: a core containing the binder resin and optional additives such as the coloring agent and the release agent; and a coating layer containing the binder resin.

The volume average particle diameter (D50v) of the toner particles is preferably from 2 μm to 10 μm inclusive and more preferably from 4 μm to 8 μm inclusive.

The volume average particle diameters of the toner particles and their grain size distribution indexes are measured using Coulter Multisizer II (manufactured by Beckman Coulter, Inc.), and ISOTON-II (manufactured by Beckman Coulter, Inc.) is used as an electrolyte.

In the measurement, 0.5 mg to 50 mg of a measurement sample is added to 2 mL of a 5% aqueous solution of a surfactant (preferably sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of 2 μm to 60 μm is measured using the Coulter Multisizer II with an aperture having an aperture diameter of 100 μm. The number of particles sampled is 50,000.

The particle size distribution measured and divided into particle size ranges (channels) is used to obtain volume-based and number-based cumulative distributions computed from the small diameter side. In the computed volume-based cumulative distribution, the particle diameter at a cumulative frequency of 16% is defined as a volume-based particle diameter D16v, and the particle diameter at a cumulative frequency of 50% is defined as a volume average particle diameter D50v. The particle diameter at a cumulative frequency of 84% is defined as a volume-based particle diameter D84v. In the number-based cumulative distribution, the particle diameter at a cumulative frequency of 16% is defined as a number-based particle diameter D16p, and the particle diameter at a cumulative frequency of 50% is defined as a number average cumulative particle diameter D50p. Moreover, the particle diameter at a cumulative frequency of 84% is defined as a number-based particle diameter D84p.

These are used to compute a volume-based grain size distribution index (GSDv) defined as $(D84v/D16v)^{1/2}$ and a number-based grain size distribution index (GSDp) defined as $(D84p/D16p)^{1/2}$.

The average circularity of the toner particles is preferably from 0.94 to 1.00 inclusive and more preferably from 0.95 to 0.98 inclusive.

The circularity of a toner particle is determined as (the peripheral length of an equivalent circle of the toner particle)/(the peripheral length of the toner particle) [i.e., (the peripheral length of a circle having the same area as a projection image of the particle)/(the peripheral length of the projection image of the particle)]. Specifically, the average circularity is a value measured by the following method.

First, the toner particles used for the measurement are collected by suction, and a flattened flow of the particles is formed. Particle images are captured as still images using flashes of light, and the average circularity is determined by subjecting the particle images to image analysis using a flow-type particle image analyzer (FPIA-3000 manufactured by SYSMEX Corporation). The number of particles sampled for determination of the average circularity is 3500.

When the toner contains the external additive, the toner (developer) for the measurement is dispersed in water containing a surfactant, and the dispersion is subjected to ultrasonic treatment. The toner particles with the external additive removed are thereby obtained.

<Electrostatic Image Developer>

An electrostatic image developer according to an exemplary embodiment contains at least the toner according to the preceding exemplary embodiment.

The electrostatic image developer according to the present exemplary embodiment may be a one-component developer containing only the toner according to the preceding exemplary embodiment or a two-component developer containing the toner and a carrier.

No particular limitation is imposed on the carrier, and a well-known carrier may be used. Examples of the carrier include: a coated carrier prepared by coating the surface of a core material formed of a magnetic powder with a coating resin; a magnetic powder-dispersed carrier prepared by dispersing a magnetic powder in a matrix resin; and a resin-impregnated carrier prepared by impregnating a porous magnetic powder with a resin.

In each of the magnetic powder-dispersed carrier and the resin-impregnated carrier, the particles included in the carrier may be used as cores, and the cores may be coated with a coating resin.

EXAMPLES

Examples of the present disclosure will be described. However, the present disclosure is not limited to these Examples. In the following description, "parts" and "%" are all based on mass, unless otherwise specified.

<Synthesis of Polyester Resin (1)>

A reaction vessel equipped with a stirrer, a thermometer, a condenser, and a nitrogen gas introduction tube is charged with raw materials including 5 parts by mole of ethylene oxide 2 mol adduct of bisphenol A, 45 parts by mole of propylene oxide 2 mol adduct of bisphenol A, 40 parts by mole of terephthalic acid, 10 parts by mole of isophthalic acid, and 10 parts by mole of n-dodecenyl succinic acid and also with dibutyl tin oxide used as a catalyst. Nitrogen gas is introduced into the vessel, and the vessel is heated while the inert atmosphere is maintained. Then a co-condensation polymerization reaction is allowed to proceed at 230° C. for about 12 hours, and the pressure is gradually reduced at 200° C. to thereby synthesize a polyester resin (1).

The polyester resin (1) obtained has a weight average molecular weight (Mw) of 17100, an acid value of 12.5 mg KOH/g, a glass transition temperature (Tg) of 58° C., and a melting point (Tm) of 109° C.

<Production of Phase-Inverted Emulsion (1)>

A reaction tank equipped with a stirrer, a condenser, and a thermometer is charged with 100 parts of the polyester resin (1) serving as a resin and with 70 parts of ethyl acetate and 15 parts of isopropanol that serve as an organic solvent. Then the mixture is stirred at 50° C. for 30 minutes to dissolve the resin in the organic solvent. 5 Parts of 10% by mass ammonia water used as a neutralizer is added to 185 parts of the obtained resin solution to adjust the neutralization rate to 132%. Then 330 parts of pure water at 40° C. is gradually added to obtain a phase-inverted emulsion (1).

Example 1

<Production of Amorphous Polyester Resin Particle Dispersion (1)>

520 Parts of the phase-inverted emulsion (1) is transferred to the distillation tank of the reduced pressure distillation device shown in FIG. 2. The concentration of solids in the transferred phase-inverted emulsion is computed and found to be 19%.

The conditions for the reduced pressure distillation device shown in FIG. 2 are as follows.

Gutter-shaped agitation impellers: half pipes
Installation angle θ [°] of the gutter-shaped agitation impellers with respect to the agitating shaft: 20°
Number of rotations N [rpm] of the agitating shaft: 85 rpm
Inner diameter D [m] of the distillation tank: 4 m
Maximum diameter d [m] of the rotation trajectory of the gutter-shaped agitation impellers: 3.4 m
N·sin θ=29 rad/m
d/D=0.85

Then the temperature of jacket water is set to 80° C., and the pressure inside the bath is gradually reduced such that the temperature inside the bath reaches 35° C. When the concentration of solids in the phase-inverted emulsion (the concentration of solids in the phase-inverted emulsion before the addition of water) has reached 35% (solution viscosity: 10 mPa·sec) and the temperature T1 of the phase-inverted emulsion has reached 35° C., 50 parts of water at 20° C. (temperature T3) is added to reduce the concentration of the solids in the phase-inverted emulsion (the concentration of the solids in the phase-inverted emulsion after the addition of water) to 30%. The rate of distillate collection at the start of the addition of water is 35 kg/h/m². The temperature T2 of the jacket water at the start of the addition of water is 80° C.

The distillate is sampled from the distillation tank at appropriate times. When the concentration of the residual organic solvent determined by gas chromatography has reached 500 ppm, the pressure is returned to normal pressure while the jacket temperature is reduced to 40° C. to finish the reduced pressure distillation, and the amount of the distillate collected is determined. Then the distillate is caused to pass through a filter with a mesh size of 106 μm to thereby obtain an amorphous polyester resin particle dispersion (1).

The maximum concentration of solids in the phase-inverted emulsion during the reduced pressure distillation is 38%, and the maximum viscosity of the phase-inverted emulsion during the reduced pressure distillation is 15 mPa·sec.

No adhesion is found on the wall surface of the distillation tank, and the yield of the resin particle dispersion is 99.5%. The amount of the collected distillate (the amount of the collected distillate after the pressure has returned to normal pressure) relative to the mass at the start of the reduced pressure distillation is "the mass at the start of the reduced pressure distillation×0.59."

Examples 2 to 27

Amorphous polyester resin particle dispersions are obtained using the same procedure as in Example 1 except that the reduced pressure distillation conditions are changed as shown in Table 1.

Examples 28 to 31

Amorphous polyester resin particle dispersions are obtained using the same procedure as in Example 1 except that the concentration of the residual organic solvent determined by gas chromatography is changed to a value shown in Table 1.

Comparative Example 1

An amorphous polyester resin particle dispersion is obtained using the same procedure as in Example 1 except that no water is added to the phase-inverted emulsion during the reduced pressure distillation.

Evaluation

<Yield of Resin Particle Dispersion>

The yield of the resin particle dispersion is computed from the mass of the resin particle dispersion after the reduced pressure distillation and the actually measured concentration of solids and evaluated according to the following criteria.
AO: 99% or more
BΔ: 98% or more
Cx: less than 98%

(Adhesion to Wall Surface of Distillation Tank)

The wall surface of the distillation tank is visually observed, and the state of adhesion of the resin is evaluated according to the following criteria.
AO: No adhesion of the resin is found.
BΔ: Slight adhesion of the resin is found.
Cx: The degree of adhesion of the resin is so high that it is necessary to wash the apparatus.

(Amount of Collected Distillate)

The distillate in the tubing is sampled, and the amount of the collected distillate when the concentration of the residual organic solvent determined by gas chromatography has become less than 1% is evaluated according to the following criteria.
AO: The amount of the collected distillate is 0.59× the mass at the start of the reduced pressure distillation.
BΔ: The amount of the collected distillate is 0.59 to 0.6 or less×the mass at the start of the reduced pressure distillation.
Cx: The amount of the collected distillate is more than 0.6× the mass at the start of the reduced pressure distillation.

TABLE 1

| | Phase-inverted emulsion | | | | | | | Concentration of solids in phase-inverted emulsion at start of dropwise addition of water % | Amount of water added dropwise Parts | Concentration of solids in phase-inverted emulsion after dropwise addition of water % | Maximum concentration of solids in phase-inverted emulsion during reduced pressure distillation % |
|---|---|---|---|---|---|---|---|---|---|---|---|
| | Type | Tg of resin (° C.) | θ ° | N rpm | N·sinθ | D m | d/D | | | | |
| Comparative Example 1 | 1 | 58 | 20 | 85 | 29 | 4 | 0.85 | — | — | — | 47% |
| Example 1 | 1 | 58 | 20 | 85 | 29 | 4 | 0.85 | 35% | 50 | 30% | 38% |
| Example 2 | 1 | 58 | 10 | 165 | 29 | 4 | 0.85 | 35% | 50 | 30% | 38% |
| Example 3 | 1 | 58 | 45 | 40 | 28 | 4 | 0.85 | 35% | 50 | 30% | 38% |

TABLE 1-continued

| Example | | | | | | | | | | | |
|---|---|---|---|---|---|---|---|---|---|---|---|
| Example 4 | 1 | 58 | 20 | 35 | 12 | 4 | 0.85 | 35% | 50 | 30% | 38% |
| Example 5 | 1 | 58 | 20 | 40 | 14 | 4 | 0.85 | 35% | 50 | 30% | 38% |
| Example 6 | 1 | 58 | 20 | 175 | 60 | 4 | 0.85 | 35% | 50 | 30% | 38% |
| Example 7 | 1 | 58 | 20 | 180 | 62 | 4 | 0.85 | 35% | 50 | 30% | 38% |
| Example 8 | 1 | 58 | 20 | 165 | 56 | 0.4 | 0.85 | 35% | 50 | 30% | 38% |
| Example 9 | 1 | 58 | 20 | 80 | 27 | 5 | 0.85 | 35% | 50 | 30% | 38% |
| Example 10 | 1 | 58 | 20 | 85 | 29 | 4 | 0.74 | 35% | 50 | 30% | 38% |
| Example 11 | 1 | 58 | 20 | 85 | 29 | 4 | 0.75 | 35% | 50 | 30% | 38% |
| Example 12 | 1 | 58 | 20 | 85 | 29 | 4 | 0.95 | 35% | 50 | 30% | 38% |
| Example 13 | 1 | 58 | 20 | 85 | 29 | 4 | 0.96 | 35% | 50 | 30% | 38% |
| Example 14 | 1 | 58 | 20 | 85 | 29 | 4 | 0.85 | 46% | 50 | 37% | 38% |
| Example 15 | 1 | 58 | 20 | 85 | 29 | 4 | 0.85 | 45% | 50 | 37% | 38% |
| Example 16 | 1 | 58 | 20 | 85 | 29 | 4 | 0.85 | 35% | 110 | 25% | 32% |
| Example 17 | 1 | 58 | 20 | 85 | 29 | 4 | 0.85 | 35% | 150 | 23% | 28% |
| Example 18 | 1 | 58 | 20 | 85 | 29 | 4 | 0.85 | 45% | 50 | 37% | 38% |
| Example 19 | 1 | 58 | 20 | 85 | 29 | 4 | 0.85 | 35% | 50 | 30% | 38% |
| Example 20 | 1 | 58 | 20 | 85 | 29 | 4 | 0.85 | 35% | 50 | 30% | 38% |
| Example 21 | 1 | 58 | 20 | 85 | 29 | 4 | 0.85 | 35% | 50 | 30% | 38% |
| Example 22 | 1 | 58 | 20 | 85 | 29 | 4 | 0.85 | 35% | 50 | 30% | 38% |
| Example 23 | 1 | 58 | 20 | 85 | 29 | 4 | 0.85 | 35% | 50 | 30% | 38% |
| Example 24 | 1 | 58 | 20 | 85 | 29 | 4 | 0.85 | 35% | 50 | 30% | 38% |
| Example 25 | 1 | 58 | 20 | 85 | 29 | 4 | 0.85 | 35% | 50 | 30% | 38% |
| Example 26 | 1 | 58 | 20 | 85 | 29 | 4 | 0.85 | 35% | 50 | 30% | 38% |
| Example 27 | 1 | 58 | 20 | 85 | 29 | 4 | 0.85 | 35% | 50 | 30% | 38% |
| Example 28 | 1 | 58 | 20 | 85 | 29 | 4 | 0.85 | 35% | 50 | 30% | 38% |
| Example 29 | 1 | 58 | 20 | 85 | 29 | 4 | 0.85 | 35% | 50 | 30% | 38% |
| Example 30 | 1 | 58 | 20 | 85 | 29 | 4 | 0.85 | 35% | 50 | 30% | 38% |
| Example 31 | 1 | 58 | 20 | 85 | 29 | 4 | 0.85 | 35% | 50 | 30% | 38% |

| | Maximum viscosity of phase-inverted emulsion during reduced pressure distillation mPa·sec | Rate of distillate collection at start of addition of water kg/h/m$^2$ | Temperature T1 of phase-inverted emulsion at start of addition of water °C. | Temperature T2 of jacket water at start of addition of water °C. | Temperature T3 of water added °C. | Amount of residual organic solvent ppm | Adhesion to wall surface of reduced pressure distillation tank | Yield | Amount of collected distillate |
|---|---|---|---|---|---|---|---|---|---|
| Comparative Example 1 | 45 | — | — | 80 | — | 500 | C✗ | C✗ | A○ |
| Example 1 | 15 | 35 | 35 | 80 | 20 | 500 | A○ | A○ | A○ |
| Example 2 | 15 | 35 | 35 | 80 | 20 | 500 | A○ | A○ | A○ |
| Example 3 | 15 | 35 | 35 | 80 | 20 | 500 | A○ | A○ | A○ |
| Example 4 | 15 | 35 | 35 | 80 | 20 | 500 | BΔ | A○ | A○ |
| Example 5 | 15 | 35 | 35 | 80 | 20 | 500 | A○ | A○ | A○ |
| Example 6 | 15 | 35 | 35 | 80 | 20 | 500 | A○ | A○ | A○ |
| Example 7 | 15 | 35 | 35 | 80 | 20 | 500 | BΔ | A○ | A○ |
| Example 8 | 15 | 35 | 35 | 80 | 20 | 500 | A○ | A○ | A○ |
| Example 9 | 15 | 35 | 35 | 80 | 20 | 500 | A○ | A○ | A○ |
| Example 10 | 15 | 35 | 35 | 80 | 20 | 500 | BΔ | A○ | A○ |
| Example 11 | 15 | 35 | 35 | 80 | 20 | 500 | A○ | A○ | A○ |
| Example 12 | 15 | 35 | 35 | 80 | 20 | 500 | A○ | A○ | A○ |
| Example 13 | 15 | 35 | 35 | 80 | 20 | 500 | BΔ | A○ | A○ |
| Example 14 | 35 | 35 | 35 | 80 | 20 | 500 | BΔ | A○ | A○ |
| Example 15 | 30 | 35 | 35 | 80 | 20 | 500 | BΔ | A○ | A○ |
| Example 16 | 10 | 35 | 35 | 80 | 20 | 500 | A○ | A○ | BΔ |
| Example 17 | 6 | 35 | 35 | 80 | 20 | 500 | A○ | A○ | C✗ |
| Example 18 | 30 | 60 | 30 | 90 | 20 | 500 | BΔ | BΔ | A○ |
| Example 19 | 15 | 65 | 30 | 93 | 20 | 500 | BΔ | BΔ | A○ |
| Example 20 | 15 | 35 | 23 | 80 | 20 | 500 | BΔ | A○ | C✗ |
| Example 21 | 15 | 45 | 25 | 80 | 20 | 500 | BΔ | A○ | BΔ |
| Example 22 | 15 | 20 | 57 | 80 | 20 | 500 | BΔ | A○ | A○ |
| Example 23 | 15 | 15 | 59 | 80 | 20 | 500 | BΔ | BΔ | A○ |
| Example 24 | 15 | 55 | 40 | 95 | 20 | 500 | BΔ | BΔ | A○ |
| Example 25 | 15 | 35 | 35 | 80 | 10 | 500 | A○ | BΔ | BΔ |
| Example 26 | 15 | 35 | 35 | 80 | 15 | 500 | A○ | A○ | A○ |
| Example 27 | 15 | 35 | 35 | 80 | 57 | 500 | BΔ | BΔ | A○ |
| Example 28 | 15 | 35 | 35 | 80 | 20 | 20 | BΔ | BΔ | C✗ |
| Example 29 | 15 | 35 | 35 | 80 | 20 | 25 | BΔ | A○ | BΔ |
| Example 30 | 15 | 35 | 35 | 80 | 20 | 3000 | A○ | A○ | A○ |
| Example 31 | 15 | 35 | 35 | 80 | 20 | 3500 | A○ | A○ | A○ |

As can be seen from the above results, with the resin particle dispersion production methods in the Examples, the degree of reduction in the yield caused by the adhesion of the resin to the inner wall surface of the distillation tank is smaller than that in the Comparative Example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a resin particle dispersion, the method comprising:
   preparing a phase-inverted emulsion by phase inversion emulsification of a resin using an organic solvent and an aqueous medium; and
   removing the organic solvent from the phase-inverted emulsion by reduced pressure distillation,
   wherein the reduced pressure distillation is performed using a reduced pressure distillation device including
   a distillation tank that contains the phase-inverted emulsion,
   a heating unit that heats a tank wall of the distillation tank by causing a heated fluid to flow inside the heating unit, and
   an agitating unit disposed inside the distillation tank, the agitating unit including an agitating shaft and one or a plurality of gutter-shaped agitation impellers that are attached to the agitating shaft, rotate to agitate the phase-inverted emulsion, and draw up the phase-inverted emulsion to form a liquid film of the phase-inverted emulsion on a heat transfer surface of the distillation tank in a portion above a liquid level of the phase-inverted emulsion, and
   wherein the aqueous medium is added to the phase-inverted emulsion contained in the distillation tank during the reduced pressure distillation; and
   wherein an installation angle θ [°] of each of the gutter-shaped agitation impellers with respect to the agitating shaft, the number of rotations N [rpm] of the agitating shaft, the inner diameter D [m] of the distillation tank, and the maximum diameter d [m] of a rotation trajectory of the gutter-shaped agitation impellers satisfy relations represented by the following formulas 1 to 4:

$10 \leq \theta \leq 45$,      formula 1

$14 \leq N \cdot \sin\theta \leq 60$,      formula 2

$0.4 \leq D \leq 5$, and      formula 3

$0.75 \leq d/D \leq 0.95$.      formula 4

2. The method for producing a resin particle dispersion according to claim 1, wherein the aqueous medium is added to the phase-inverted emulsion contained in the distillation tank during the reduced pressure distillation such that the concentration of solids in the phase-inverted emulsion is maintained in the range of 25% by mass to 45% by mass.

3. The method for producing a resin particle dispersion according to claim 1, wherein the aqueous medium is added to the phase-inverted emulsion contained in the distillation tank during the reduced pressure distillation such that the maximum viscosity of the phase-inverted emulsion is maintained in the range of 30 mPa·sec or less.

4. The method for producing a resin particle dispersion according to claim 2, wherein the aqueous medium is added to the phase-inverted emulsion contained in the distillation tank during the reduced pressure distillation such that the maximum viscosity of the phase-inverted emulsion is maintained in the range of 30 mPa·sec or less.

5. A method for producing a resin particle dispersion, the method comprising:
   preparing a phase-inverted emulsion by phase inversion emulsification of a resin using an organic solvent and an aqueous medium; and
   removing the organic solvent from the phase-inverted emulsion by reduced pressure distillation,
   wherein the reduced pressure distillation is performed using a reduced pressure distillation device including
   a distillation tank that contains the phase-inverted emulsion,
   a heating unit that heats a tank wall of the distillation tank by causing a heated fluid to flow inside the heating unit, and
   an agitating unit disposed inside the distillation tank, the agitating unit including an agitating shaft and one or a plurality of gutter-shaped agitation impellers that are attached to the agitating shaft, rotate to agitate the phase-inverted emulsion, and draw up the phase-inverted emulsion to form a liquid film of the phase-inverted emulsion on a heat transfer surface of the distillation tank in a portion above a liquid level of the phase-inverted emulsion, and
   wherein the aqueous medium is added to the phase-inverted emulsion contained in the distillation tank during the reduced pressure distillation; and
   wherein the rate of distillate collection per unit area of the heat transfer surface of the distillation tank when the aqueous medium is added to the phase-inverted emulsion contained in the distillation tank during the reduced pressure distillation is 60 kg/h/m$^2$ or less.

6. A method for producing a resin particle dispersion, the method comprising:
   preparing a phase-inverted emulsion by phase inversion emulsification of a resin using an organic solvent and an aqueous medium; and
   removing the organic solvent from the phase-inverted emulsion by reduced pressure distillation,
   wherein the reduced pressure distillation is performed using a reduced pressure distillation device including
   a distillation tank that contains the phase-inverted emulsion,
   a heating unit that heats a tank wall of the distillation tank by causing a heated fluid to flow inside the heating unit, and
   an agitating unit disposed inside the distillation tank, the agitating unit including an agitating shaft and one or a plurality of gutter-shaped agitation impellers that are attached to the agitating shaft, rotate to agitate the phase-inverted emulsion, and draw up the phase-inverted emulsion to form a liquid film of the phase-inverted emulsion on a heat transfer surface of the distillation tank in a portion above a liquid level of the phase-inverted emulsion, and
   wherein the aqueous medium is added to the phase-inverted emulsion contained in the distillation tank during the reduced pressure distillation; and
   wherein a temperature T1 of the phase-inverted emulsion when the aqueous medium is added to the phase-inverted emulsion contained in the distillation tank during the reduced pressure distillation is equal to or higher than 25° C. and equal to or lower than (the glass transition temperature Tg of the resin−1° C.),
   wherein a temperature T2 of the heated fluid flowing inside the heating unit is 95° C. or lower, and
   wherein a temperature T1 and the temperature T2 satisfy the relation T1<T2.

7. The method for producing a resin particle dispersion according to claim 1, wherein a temperature T3 of the aqueous medium added to the phase-inverted emulsion contained in the distillation tank during the reduced pressure distillation is equal to or lower than (the glass transition temperature Tg of the resin−1° C.).

8. The method for producing a resin particle dispersion according to claim 7, wherein the temperature T3 of the aqueous medium is equal to or higher than (the glass transition temperature Tg of the resin −30° ° C.) and equal to or lower than (the glass transition temperature Tg of the resin−1° C.) and is 5° C. or higher.

9. The method for producing a resin particle dispersion according to claim 1, wherein the rate of addition of the aqueous medium added to the phase-inverted emulsion contained in the distillation tank during the reduced pressure distillation is such that fluctuations of a temperature T1 of the phase-inverted emulsion contained in the distillation tank when the aqueous medium is added to the phase-inverted emulsion during the reduced pressure distillation are within +5.

10. The method for producing a resin particle dispersion according to claim 1, wherein the phase-inverted emulsion is produced in an emulsification tank, then transferred from the emulsification tank to the distillation tank, and then subjected to the reduced pressure distillation.

11. The method for producing a resin particle dispersion according to claim 1, wherein the resin is a resin having a polar group.

12. The method for producing a resin particle dispersion according to claim 11, wherein the resin having a polar group is a resin having an acid value.

13. The method for producing a resin particle dispersion according to claim 1, wherein the content of the organic solvent remaining in the resin particle dispersion is from 25 ppm to 3000 ppm inclusive.

14. The method for producing a resin particle dispersion according to claim 1, wherein a resin particle dispersion for a toner is produced.

15. A method for producing a toner for electrostatic image development, the method comprising:
   forming aggregated particles by aggregating, in a dispersion containing resin particles in a resin particle dispersion obtained by the resin particle dispersion production method according to claim 1, at least the resin particles;
   and fusing and coalescing the aggregated particles by heating an aggregated particle dispersion containing the aggregated particles dispersed therein to thereby form toner particles.

16. A toner for electrostatic image development comprising toner particles obtained by the method for producing a toner for electrostatic image development according to claim 15.

17. The method for producing a resin particle dispersion according to claim 1, wherein the rate of distillate collection per unit area of the heat transfer surface of the distillation tank when the aqueous medium is added to the phase-inverted emulsion contained in the distillation tank during the reduced pressure distillation is 60 kg/h/m² or less.

18. The method for producing a resin particle dispersion according to claim 1, wherein a temperature T1 of the phase-inverted emulsion when the aqueous medium is added to the phase-inverted emulsion contained in the distillation tank during the reduced pressure distillation is equal to or higher than 25° C. and equal to or lower than (the glass transition temperature Tg of the resin−1° C.),
   wherein a temperature T2 of the heated fluid flowing inside the heating unit is 95° C. or lower, and
   wherein a temperature T1 and the temperature T2 satisfy the relation T1<T2.

19. The method for producing a resin particle dispersion according to claim 5, wherein the aqueous medium is added to the phase-inverted emulsion contained in the distillation tank during the reduced pressure distillation such that the concentration of solids in the phase-inverted emulsion is maintained in the range of 25% by mass to 45% by mass.

20. The method for producing a resin particle dispersion according to claim 6, wherein the aqueous medium is added to the phase-inverted emulsion contained in the distillation tank during the reduced pressure distillation such that the concentration of solids in the phase-inverted emulsion is maintained in the range of 25% by mass to 45% by mass.

* * * * *